US010346829B2

(12) United States Patent
Mercille

(10) Patent No.: US 10,346,829 B2
(45) Date of Patent: Jul. 9, 2019

(54) DISPLAY OF LOCALLY BROADCASTED UNIFORM RESOURCE LOCATORS FOR CHECKOUT AND PAYMENT

(71) Applicant: PAYPAL, INC., San Jose, CA (US)

(72) Inventor: Richard Mercille, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 705 days.

(21) Appl. No.: 14/985,347

(22) Filed: Dec. 30, 2015

(65) Prior Publication Data

US 2017/0193475 A1 Jul. 6, 2017

(51) Int. Cl.
G06Q 30/00 (2012.01)
G06Q 20/20 (2012.01)
G06Q 20/10 (2012.01)
G06Q 20/32 (2012.01)

(52) U.S. Cl.
CPC ..... *G06Q 20/3274* (2013.01); *G06Q 20/3224* (2013.01)

(58) Field of Classification Search
CPC ........... G06Q 20/3224; G06Q 30/0601; G06Q 20/20; G06Q 20/32; G06Q 10/02; G06Q 30/0267; G06Q 20/10
USPC ......................................................... 705/40
See application file for complete search history.

(56) References Cited

U.S. PATENT DOCUMENTS

| 2012/0214443 | A1* | 8/2012 | Daigle | .................. H04L 9/3228 455/411 |
| 2013/0085931 | A1* | 4/2013 | Runyan | ................ G06Q 20/322 705/40 |
| 2013/0317923 | A1* | 11/2013 | Capps | .................... G06Q 30/06 705/16 |

* cited by examiner

*Primary Examiner* — Hao Fu
(74) *Attorney, Agent, or Firm* — Haynes and Boone, LLP

(57) ABSTRACT

There are provided systems and methods for display of locally broadcasted uniform resource locators for checkout and payment. A user may utilize a computing device, such as a mobile phone, to receive a plurality of local broadcasts. The broadcasts may be limited in range to a defined region through short range communications or geo-locations of users or entities. Thus, the computing device may display the broadcasts for nearby users and entities. The broadcast may contain a URL that unique identifiers the user or entity and the checkout and payment process for the payment requested by the user or entity. The URL may cause a device receiving the URL to load a webpage or application interface having the checkout and payment process. The user may then use the process in the broadcast to provide a payment to another user or entity.

20 Claims, 7 Drawing Sheets

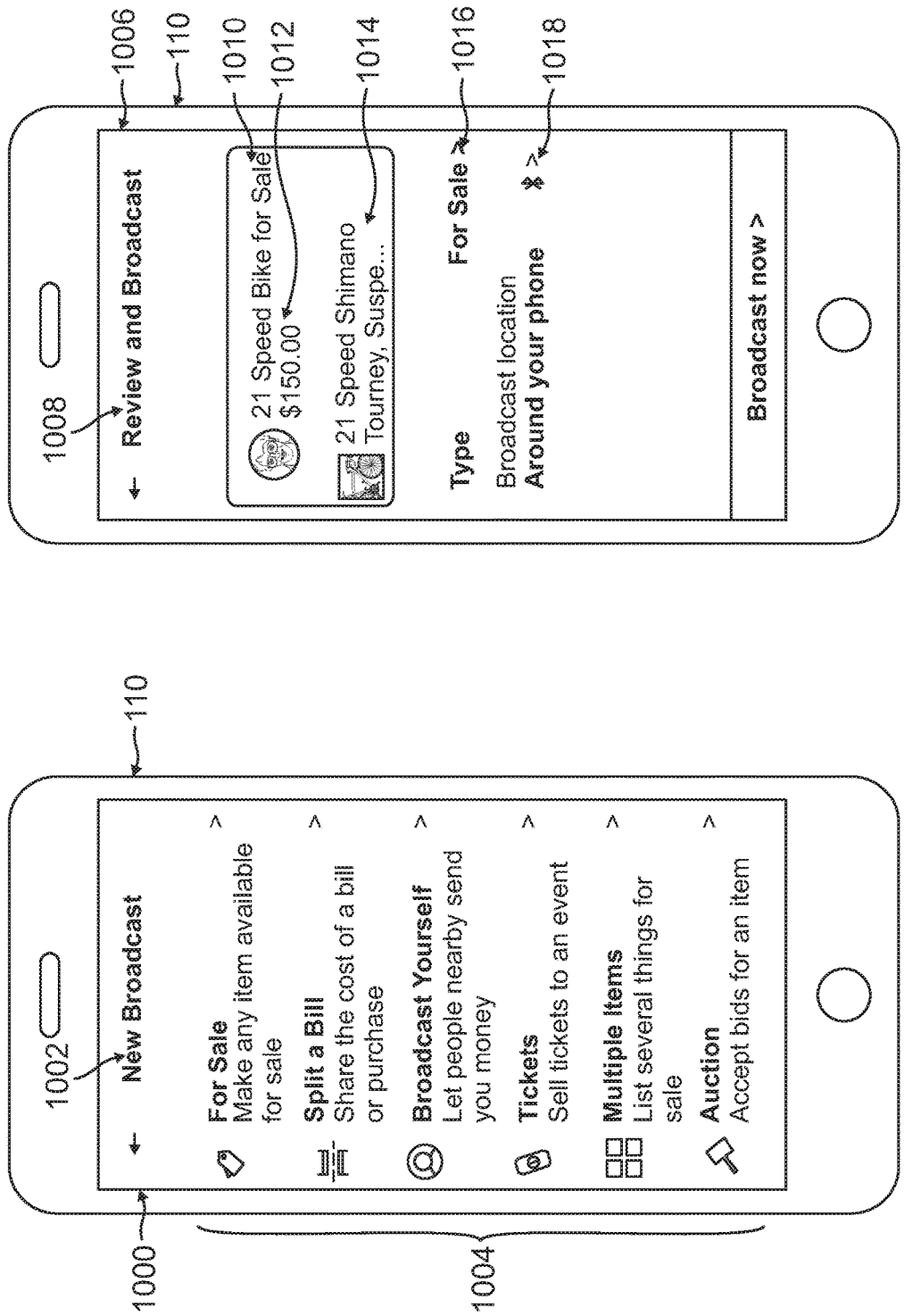

DISPLAY OF LOCALLY BROADCASTED UNIFORM RESOURCE LOCATORS FOR CHECKOUT AND PAYMENT

TECHNICAL FIELD

The present application generally relates to receipt and transmission of locally broadcasted data and more specifically to display of locally broadcasted uniform resource locators for checkout and payment.

BACKGROUND

Users may wish to provide payments to nearby users and/or devices, for example, to purchase products, provide reimbursement, loan money, or other financial reason. Traditionally, cash may be freely exchanged between nearby parties. However, more recently cash has been less favored as parties may have security concerns over carrying large amounts of cash or be less likely to visit a financial institution to retrieve available cash. Modernly, users are more likely to purchase items and/or provide payments using mobile devices and online payment providers, where the mobile devices may provide a payment application to initiate a payment process to another nearby user, device, or other entity. In this regard, the payment applications require identification of the party engaged in the transaction with the party utilizing the payment application on their mobile device. However, identification of a party in a transaction is often time consuming and difficult in a payment application, as it requires entry of an identifier for the other party, searching for the identifier for the party, and/or entry of transaction terms. Thus, it may be time consuming and laborious to utilize a payment application for payment processes with nearby users.

BRIEF DESCRIPTION OF THE DRAWINGS

FIG. 2A is an exemplary screenshot of a communication device interface for selecting a broadcast for payment from a nearby user, according to an embodiment;

FIG. 2B is an exemplary screenshot of a communication device interface establishing a broadcast for communication to nearby devices using short range wireless communications, according to an embodiment;

Figure 1:
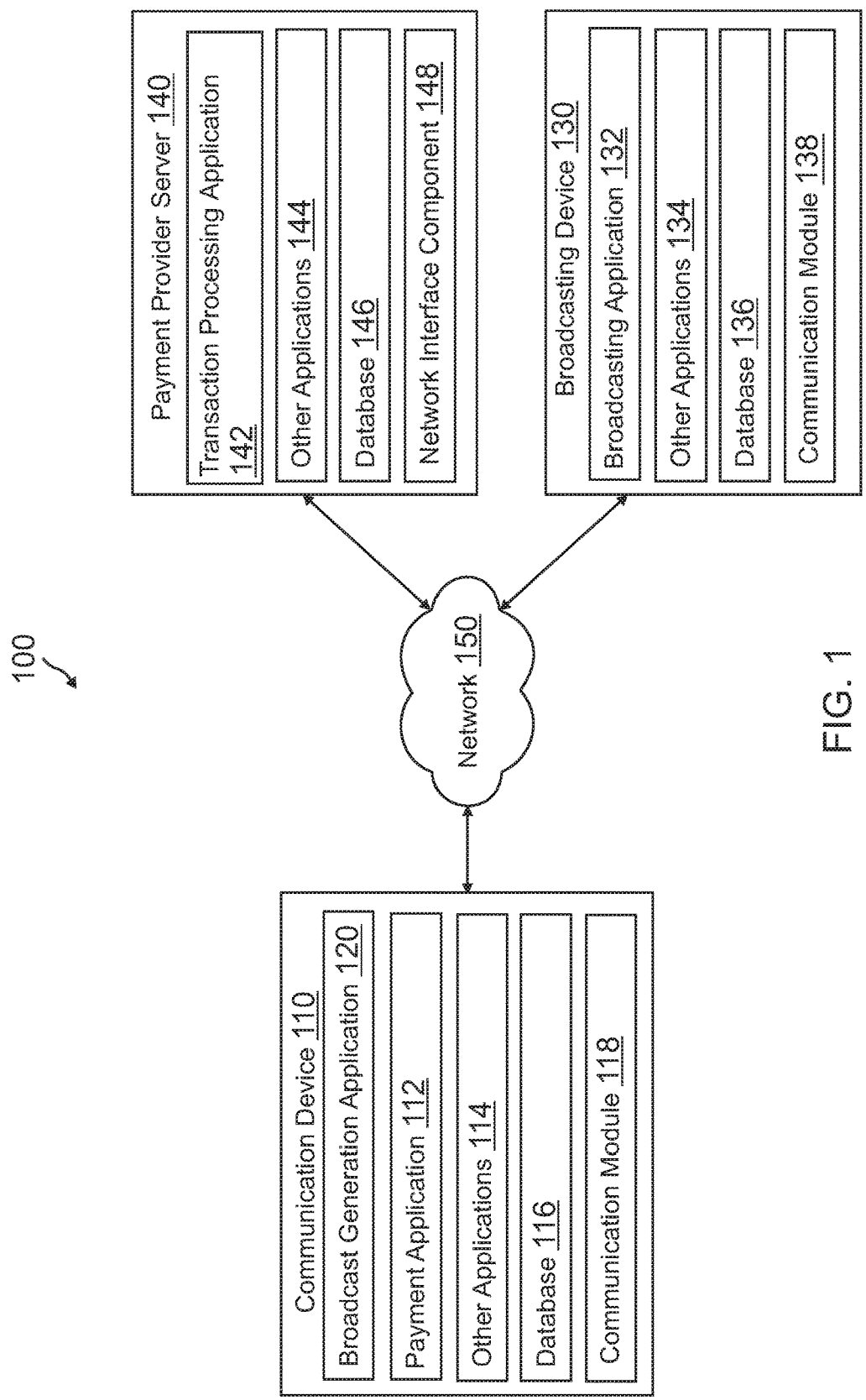
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for locally broadcasted uniform resource locators for checkout and payment processes. Systems suitable for practicing methods of the present disclosure are also provided.

A user may utilize a computing device to receive broadcasts for nearby users and entities having a checkout and payment process. In this regard, users located within proximity to each other, such as within a defined geo-graphic region and/or within short range wireless communications between devices of the users, may wish to transact with each other for the purpose of providing payments to each other. In other embodiments, users may wish to transact with automated machines, such as vending machines, automated ticketing machines, and/or other machine devices that accept payments and provide products, goods, and/or services (referred to herein as an "item" or "items"). Traditionally, users may utilize cash or payment cards for such services. However, and as described herein, users may instead utilize payment applications executing on a computing device for the purposes of payment processing. In order to provide discovery of these nearby users and/or devices, a user may utilize one such payment application on the user's computing device to detect nearby broadcasts of checkout and payment processes for the nearby users and/or devices. The user, or a device/merchant, may also establish a locally broadcasted checkout and payment process, for example, using the payment application and an associated device.

In this regard, a computing device for the user may include a payment application as one of the device applications, which may be configured to send and receive payments to another party, such as another user, device, and/or a merchant. In certain embodiments, the payment application may correspond to a web browser application configured to access a website for the payment provider. For example, the payment application may access a website associated with a payment provider, such as PayPal® or other online payment provider service, which may provide payments and other financial services on behalf of a user (e.g., the payer(s) and/or payees). In other embodiments, the payment application may correspond to a dedicated application of the payment provider, which may include application interfaces utilized to send and receive payments. The online payment provider may provide such services through the payment application and data sent and received over a network connection between the online payment provider and the device executing the payment application. Additionally, the online payment provider may provide payment accounts and digital wallet services, which may offer financial accounts to send, store, and receive money, process financial instruments, and/or provide transaction histories. The online payment provider may offer further services, such as extension of credit, credit history review, and other financial and personal services.

The payment application may therefore provide one or more processes and features for use of the services provided by the online payment provider. When desiring to establish a locally broadcasted checkout and payment process, the user may utilize the payment application to establish a broadcast that may be local to the user and/or to a location specified by the user. In embodiments where the broadcast may be specific to an automated machine, such as a vending machine, a payment provider or an entity controlling the device may instead generate the broadcast and transmit the broadcast to storage by the automated device or provide the broadcast for receipt by devices within the locality of the automated device. In order to establish the local broadcast for a checkout and payment process, a request to establish the broadcast may be received, for example, from the user, a merchant, and/or an entity controlling the automated device. The payment application may provide one or more checkout and payment interfaces allowing entry and/or selection of broadcast information. The checkout and payment interface(s) may be presented through the payment application, which may correspond to an interface of a dedicated payment application for the payment provider and/or a webpage of a website for the payment provider.

The one or more interfaces of the payment application may at least allow the user to select a type of broadcast (e.g., a type of the checkout and payment process in the broadcast), a payment amount for the broadcast (e.g., a payment amount to or from the user in the checkout and payment process), and a communication pathway for transmission of the broadcast. In this regard, the type of broadcast may correspond to information used to generate the checkout and checkout and payment interface and extensions available when generating the checkout and checkout and payment interface. The type may, therefore, correspond to a sale of an item by the user, a split payment request (e.g., for a split payment of a bill), a personal broadcast of payment account information for the user to allow the user to receive and/or send payments, a listing of limited time items (e.g., ticket sales), a sale of multiple items, and/or an auction process for a sale of an item. The user may choose to name the broadcast once a type is selected, or may allow an automatic name or generic name to be applied. Once selected, the user may further enter an amount to be sent and/or received by the user. For example, if the user is selling an item, the user may request a dollar amount that the user is requesting for the item. In other embodiments, the amount entered by the user may be a base or starting amount for an auction, a total price for a bill with split payment information for splitting the total cost of the bill with one or more other parties, and/or multiple prices for different items in a multi-item sale. Moreover, if the user is broadcasting their own personal information to send and/or receive payments, the user may omit entry of a payment amount.

When generating the broadcast, a communication pathway may also be required to be specified. The communication pathway may correspond to a communication pathway used to transmit the broadcast. For example, the broadcast may be transmitted over network communications, where the broadcast may be transmitted from the online payment provider or the communication device of the user. Thus, the broadcast may be made available over network communications to other devices within a defined region. In order to specify the defined region so that that broadcast is locally available, a location for the broadcast may also be specified. The location may correspond to a location of the user, automated device, and/or merchant. In this regard, the location may be set, for example, using location coordinates (e.g., a geo-position, such as latitude/longitude coordinates), an address, a landmark or location name, or a broader area, such as a street block, a city, etc. The location may also be dynamic by utilizing a geo-position of the user, automated device, and/or merchant, which may be detected using a location detection service associated with the user, automated device, and/or merchant (e.g., a GPS locator). A proximity or geofence surrounding the location may also be established for the broadcast, which may be used to communicate the broadcast to all or a subset of devices within the proximity to the location.

In other embodiments, the broadcast may be made locally available using short range wireless communications between the device transmitting the broadcast and nearby devices. For example, Bluetooth Low Energy (BLE), LTE Direct, and other types of communication protocols may be utilized to provide an "always on" type service where the broadcast may be continually and/or intermittently broadcasted, or a request to establish a connection and transmit the broadcast may be transmitted. Thus, other nearby devices detecting the short range wireless communications may receive the broadcast and/or request and may retrieve the broadcast and associated data with the broadcast. Other types of communication protocols may also be utilized, such as Bluetooth, WiFi, near field communications, infrared, radio, etc.

The user may provide additional information to establish the broadcast and/or information transmitted with the broadcast in various embodiments. For example, the user may provide a picture or image with the broadcast. The image may be of the user to allow for identification of the user through the broadcast and in person, or may be an image of a sold product, an image associated with a bill for a split bill payment, a location or landmark, or other type of image. The user may provide a description, for example, of the item for sale, reason for the broadcast, and/or request for payment. The user may also provide information used for the checkout and payment process payments, such as a number of users for a split payment, a percentage or amount for users for a split payment, an auction minimum amount and/or instant purchase amount, or other type of information.

Once the information for the broadcast is received, the broadcast may be generated. For example, the payment application and/or payment provider may establish the checkout and checkout and payment interface for use in sending and/or receiving payments according to the information provided with the request to establish the broadcast (e.g. the payment amount, type, terms, name, description, etc.). The checkout and checkout and payment interface may therefore correspond to an accessible interface (e.g., webpage interface of a webpage of the payment provider) and/or data to load to a checkout and checkout and payment interface of the payment application. Thus, the checkout and checkout and payment interface may be generated as a separate and accessible webpage or other retrievable data document that presents the checkout and checkout and payment interface, or may correspond to a data structure loaded to a payment application that causes display of the information for the checkout and checkout and payment interface within the interface(s) of the payment application.

In order to access and/or load the checkout and checkout and payment interface, the payment application and/or payment provider may generate an address, hyperlink, or other directory information for the checkout and payment interface that allows the payer(s) to navigate to the checkout and payment interface through a device and process payments specified in the checkout and payment interface. In this regard, the payment application and/or payment provider may generate a Uniform Resource Locator (URL) address that directs the user to the webpage for the checkout and payment interface and/or causes deep-links to a specific location within the payment application. In this regard, mobile deep-linking utilizes a URL to open and present information within a mobile application, such as a payment application executing on a mobile computing device. Thus, more generically, the URL may be a uniform resource identifier (URI) for the payment application that may link to a specific content within the payment application, such as a generated checkout and payment interface. Where the URI causes opening of a generic checkout and payment interface, the URI and/or the broadcast may include additional retrievable information to load the information for the checkout and payment interface.

Thus, the URL address (or URI) may be used to initiate a process to cause the checkout and payment interface for the group payment to be opened in a payment application and/or web browser of a device for the user. The URL address may further be identifiable by the user generating the broadcast, which may correspond to a URL identifying the user with the payment provider. For example, the URL address may be structured as www.paymentprovider.us/alice, where Alice is a registered user with the payment provider. In this regard, the URL address includes a hostname (e.g., www.paymentprovider.us), as well as a file name or path for the webpage (e.g., group1). In embodiments where the URL address correspond to a URI address for deep-linking into the payment application, the URI may include an address that causes launching of the payment application (e.g., paymentapplication://) as well as the specifically retrievable information and/or link to application content (e.g., alice for Alice's payment account, or alice/broadcast1 for the broadcast established by Alice). However, such information may also be loaded to the payment application through other data available in the broadcast.

Once the URL or URI address to the checkout and payment interface is generated, it may be added to the broadcast and transmittable data. The broadcast may then be generated with this transmittable data, such as the URL/URI and/or additional data (e.g., broadcast name, description, or other data to populate when viewing the broadcast in a listing and/or data used to load into an interface of a payment application). The broadcast may be provided for the communication device of the user, automated device, and/or merchant to transmit over short range wireless communications to other devices is close enough proximity to the communication device to receive the broadcast. Thus, the broadcast may be made locally available when short range wireless communications are selected and the communication pathway. The communication device may then provide the broadcast over short range wireless communications, such as BLE. However, or in addition to short range wireless communications as the communication pathway, the user may also select geo-location based communication of the broadcast, as previously discussed. In such embodiments, the communication device of the user, automated device, or merchant, and/or the online payment provider, may retain the broadcast. On detection of other devices at the geo-location or within the defined region of the geo-location, or when devices within this area searches for broadcasts, the communication device and/or payment provider may transmit the broadcast to those searching devices for viewing.

Thus, at least one other communication device may search for and find nearby broadcasts. When searching for broadcasts, the other communication devices may specify a geo-location of the device and/or a proximity to search for broadcasts from the geo-location and/or may utilize short range wireless communications. Thus, the other communications devices may utilize network communications and/or short range wireless communications to retrieve the broadcasts. Thus, a communication device may receive a listing of all available nearby broadcasts and display the nearby broadcasts in an interface of the communication device, which may include displayable information for the broadcast, such as a type of broadcast, a name for the broadcast, and/or a description of the broadcast. Additionally, where the distance to the device providing the broadcast is determinable, the distance to the device may be displayed, as well as a map or route to the device. In various embodiments, the list of broadcasts may also highlight known users for the broadcasts, such as friends transmitting a broadcast, contacts in a contact book application, social networking connections, or other known users.

Selection by one of the broadcasts displayed in the interface of the communication device by a user may cause display of the checkout and payment interface for the associated broadcast. The checkout and payment interface accessible through the URL or URI address may cause retrieval of the checkout and payment process. For example, the checkout and payment interface may include an amount for the checkout and payment process, such as a sent or received amount. The checkout and payment interface may also include information identifying the user, automated device, and/or merchant in the transaction for the checkout and payment interface, and information identifying the nature of the payment sent or received. The checkout and payment interface may further include a process to send and/or receive a payment. For example, the checkout and payment process may allow a payment or transfer to the entity transmitting the broadcast, or request a payment or transfer from the entity transmitting the broadcast. Additional information may be retrieved and/or displayed on selection of a broadcast, such as images associated with the broadcast, name and/or description of the broadcast, a type for the broadcast, and/or other information.

Once the user of the communication device has reviewed the selected broadcast, the user may enter an amount to send and/or receive to the other transaction participant in the broadcast. In various embodiments, this amount may be automatically loaded and preset by the broadcast. The user may review the amount and may select a payment instrument. The checkout and payment process may utilize a payment account for the user of the communication device displaying the broadcasts and processing one of the broadcasts. The checkout and payment process by the payment provider may allow the payer to perform a single payment/transfer, or may allow the payer to perform multiple transactions for payments/transfers to the payees. Once the user is ready to process a payment, the checkout and payment interface may allow the user to login to a payment account with the payment provider to effectuate a payment. The checkout and payment interface may therefore include a login process, such as entry of an account name and a password, or other authentication information. Where a user does not have an account with the payment provider, the checkout and payment interface may allow the user to establish a payment account with the payment provider, for example, through an account setup process accessible through the checkout and payment interface. In other embodiments, the checkout and payment interface may include fields for entry of other payment information, such as a debit card, credit card, banking account with a financial institution, gift card, or other type of payment instrument. The payment provider may the process a payment between the transaction participants according to the terms established in the checkout and payment interface. Where money is requested from the user selecting an available broadcast, the payment provider may require confirmation and/or authentication to initiate the payment between the transaction participants. The transaction participants may provide a payment account or financial instrument to send and/or receive the payment. The payment provider may further provide transaction histories that record and document the transaction, such as a digital receipt transmittable to the transaction participants and/or stored into a payment account for each of the transaction participants.

The transaction participants may then connect to provide the item for the transaction where applicable. In other embodiments, an automated device may provide an item after processing the payment, for example, by vending the item to the user. An automated machine may also correspond to a ticketing device, such as an event ticketing device, movie ticketing device, or other type of admission ticketing device. In such embodiments, the automated device may provide the admission to the user after completion of the transaction. In various embodiments, the user may be required to provide authentication and/or identification in order to receive the items. However, in embodiments where the automated device may not provide a physical item (e.g., automated parking meters and/or lots, transportation provider access, etc.), the automated device may apply the payment amount to the service provided by the automated device, such as access to a parking lot, increasing a parking meter, allowing a user to access a subway or bus, etc.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a broadcasting device 130, and a payment provider server 140 in communication over a network 150. A user (not shown) may utilize communication device 110 to utilize the various features available for communication device 110, which may include payment processes and/or applications associated with sending and receiving payments based on locally detected and received broadcasts. The payment processes and/or application may further include processes for generating and receiving local broadcasts. For example, a broadcast for broadcasting device 130 may be generated and broadcasted in an area local to broadcasting device 130. Communication device 110 may be used to detect the broadcast and retrieve a checkout and payment interface for providing a payment to broadcasting device 130. The payment may be processed using payment provider server 140.

Communication device 110, broadcasting device 130, and payment provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a device that may utilize appropriate hardware and software configured for wired and/or wireless communication with broadcasting device 130 and/or payment provider server 140. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only a single communication device is described in reference to FIG. 1, a plurality of communication devices may function similarly.

Communication device 110 of FIG. 1 contains a broadcast generation application 120, a payment application 112, other applications 114, a database 116, and a communication module 118. Payment application 112 and other applications 114 may correspond to executable processes, procedures, and/or applications with associated hardware. In other embodiments, communication device 110 may include additional or different modules having specialized hardware and/or software as required.

Broadcast generation application 120 may correspond to one or more processes to execute software modules and associated devices of communication device 110 to generate one or more broadcasts for transmission to devices located within a defined region set for the broadcast. In this regard, broadcast generation application 120 may correspond to specialized hardware and/or software utilized by a user of communication device 110 to receive a request to generate a broadcast from a user (not shown) of communication device 110. For example, broadcast generation application 120 may include one or more interfaces for use in selecting options and/or entering information to establish a broadcast. Thus, the user may search, select, and/or otherwise navigate through the interface(s) to locate a broadcast generation interface. The broadcast generation interface may request for the user to establish at least a type of broadcast, such as the type of checkout and payment process retrieved using the broadcast, as well as a payment amount for the checkout and payment process and a communication pathway for transmission of the checkout and payment process. The interfaces may include selectable options for the aforementioned information and/or may accept input, such as alphanumeric input to a field of an interface. Moreover broadcast generation application 120 may further allow for entry of further information for the broadcast, such as a name, description, location for the broadcast and defined region around the location, split payment percentages, selected users for receipt of the broadcast, and/or other applicable information. Broadcast generation application 120 may correspond to a general browser application configured to retrieve, present, and communicate information over the Internet (e.g., utilize resources on the World Wide Web) or a private network for generation of a broadcast. However, in other embodiments, broadcast generation application 120 may include a dedicated application of payment provider server 140 or other entity (e.g., a merchant), which may be configured to generate broadcasts.

Using the aforementioned information, broadcast generation application 120 may generate a broadcast. A broadcast may include a URL or other URI that identifies and causes retrieval of a checkout and payment interface for a checkout and payment process having the information and parameters entered by the user in the request to generate the broadcast. In this regard, a URL may identify a webpage that may be retrieved and have the checkout and payment process (e.g., a flow allowing a user to view payment information and provide a payment). The webpage may be specific to payment provider server 140 and/or the user, for example, by including the website address for payment provider server 140, as well as a sub-address to a webpage or collection of webpages for the user (e.g., file name extension for the user). The URL or other type of URI may instead be deep-linked to an application residing on a communication device, such as payment application 112 of communication device 110. In this regard, the URI may cause, through deep-linking, opening and/or loading of the checkout and payment interface having the established checkout and payment process entered to the interface. The URI may generically open the checkout and payment interface, where data in the broadcast is then entered to the checkout and payment interface so that the interface displays the checkout and payment process having the parameters established by the user with broadcast generation application 120. However, in other embodiments, the URI may be specific to a checkout and payment interface that specific to the checkout and payment process having the parameters established by the user with broadcast generation application 120. The URI may therefore be specific to payment provider server 140 and/or the user of communication device 110. In various embodiments, payment provider server 140 may further be used to generate the broadcast, for example, by generating the checkout and payment process and interface and/or creating the URL or URI to retrieve the associated checkout and payment interface.

Once the broadcast is generated, the broadcast may be provided in a limited area based on the communication pathway selected by the user. Where the communication pathway is selected as short range wireless communications, such as Bluetooth Low Energy (BLE), the broadcast may be limited to an area in proximity to communication device 110 that may receive the short range wireless communications. BLE may be used to effectuate an "always on" type service where the broadcast is continually broadcasted or broadcasted at certain intervals that allows nearby devices to detect the communication signal and receive the data for the broadcast. In various embodiments, such retrieval may require pairing, for example, by the exchange of identifiers and confirmation of identity. However, in other embodiments, the broadcast may be detected and generally loaded to a list of available broadcasts by other devices. Additionally, other communication protocols may be used to transmit the broadcast in a range around communication device 110, such as Bluetooth, near field communications (NFC), LTE Direct, WiFi, infrared, radio, or other communications. Moreover, broadcast generation protocol may be used to limit the distance that the broadcast is transmitted, for example, by limiting the range of the data signal transmitted for the broadcast.

In other embodiments, the user may select geo-location based broadcasting, which may provide the broadcast over a network connection to other devices within a defined region, such as a selected area and/or an area around a selection location. For example, the user may enter an address, landmark, or other location, or may select a region, such as a street block, a building, a campus, or other area. The user may also enter their location as the geo-location, which may be static or be made dynamic by changing the user's position as the user moves through detection of the user current location by a location detection service. The user may also select a defined region around the selected location, such as proximity to the selected location. In such embodiments, the broadcast may be made available to other devices within the defined region for the selected geo-location and transmitted over a network connection to those devices. Communication device 110 may provide the broadcast over network 150 to such devices. However, in other embodiments, payment provider server 140 may instead transmit the broadcast to such devices. Moreover, the user may select multiple communication pathways, thereby communicating the broadcast to nearby users of communication device 110 as well as users within a geo-location selected by the user.

Payment application 112 may correspond to one or more processes to execute software modules and associated devices of communication device 110 to enter one or more payment instruments or other funding sources for storage in a digital wallet associated with a payment account (e.g., stored and/or serviced by payment provider server 140), access and display nearby broadcasts by other users for sending and receiving payments, and process payments using the payment account. In this regard, payment application 112 may correspond to specialized hardware and/or software utilized by a user of communication device 110 that provides an interface to permit users to enter input and other data for payment instruments, for example, through an input device (e.g., touch screen with a graphical user interface displayed by payment application 112, keypad/keyboard, mouse, etc.) and/or through a data capture device (e.g., scanner, camera, other optical device, etc.). In various embodiments, information for the payment account may also be stored to communication device 110 for use in an offline environment. The payment account accessible through payment application 112 may be used to initiate, receive, and/or process/complete transactions, including sending and receiving payments through a checkout and payment interface retrievable from a received local broadcast. Once entered, the payment instruments may be communicated to payment provider server 140 over network 150 by payment application 112 for establishment and/or maintenance/update of the payment account and/or entry into the digital wallet. Additional benefits may be stored to the payment account, such as rewards programs, rewards programs membership level, rewards program points, available items in at least one rewards program, cash-back amounts for the at least one rewards program, airline miles, promotional credit, promotional credit rates, promotional discount rate, merchant discounts, merchant discount rates, and merchant coupons.

Payment application 112 may include one or more processes and associated interfaces used to retrieve nearby broadcasts from another user, automated device, and/or merchant and display the nearby broadcasts to the user of communication device 110. Thus, payment application 112 may utilize communication module 118 of communication device 110 to retrieve nearby broadcasts. In various embodiments, the broadcasts may be retrieved by receiving short range wireless communications with nearby devices transmitting the broadcasts within proximity to the nearby devices, such as a defined region where the data signal for the broadcast may be received. In such embodiments, payment application 112 may display the broadcast with information (e.g., a description or icon) that identifies the broadcast as being received through short range wireless communications. Payment application 112 may also display a distance to the device transmitting the broadcast over short range wireless communications where discoverable, which may include detection and/or receipt of a geo-location for the device transmitting the broadcast. In other embodiments, payment application 112 may provide a geo-location for communication device 110, such as an entered location by user 102 to payment application 112 and/or a geo-location determined using a GPS locator or other location detection system of communication device 110. In this regard, the location may be communicated to payment provider server 140, which may match the location to the location of stored broadcasts and/or information for broadcasts and may communicate broadcasts matching that location to communication device 110 or cause the devices associated with the matching broadcasts to transmit their broadcasts to communication device 110 for display in payment application 112.

Thus, payment application 112 may receive local broadcasts from nearby devices of users, automated devices, and/or merchants. Payment application 112 may display the broadcasts through an interface of payment application 112. The broadcasts may be displayed with additional broadcast information communicated in the data signal for the broadcast, such as a name, description, payment amount, image, and/or other information for the broadcast. The data signal may also include the URL or other URI for retrieving a checkout and payment interface having an associated checkout and payment process. In other embodiments, the broadcast's data signal may include information for retrieval of the URL. The interface may allow the user of communication device 110 to select from the broadcasts. On selection of one of the broadcasts, payment application 112 may display information for the broadcast in an interface of payment application 112. Payment application 112 may also retrieve or load the URL for the payment and checkout interface.

Using the URL (or other URI) for the broadcast, payment application may retrieve the payment and checkout interface, which may correspond to a webpage for payment provider server 140 displayed in payment application 112 or a browser application, or may correspond to an interface of payment application 112 for payment provider server 140. The interface may display information for sending and/or receiving payments, such as a payment request type (e.g., purchase of an item, splitting a bill, an auction, etc.). The interface may further include a name, description, and payment amount for the payment, as well as other information, such as an image, location of the transmitting device for the broadcast, location tag for the broadcast (e.g., location of the item for sale), or other information. The interface may allow the user to enter an amount for the payment, such as an amount to send to or receive from another user. However, in other embodiments, the payment amount may be static an unable to be changed by the user. Once the user is satisfied with the information in the interface, the user may utilize payment application 112 to process a payment through the interface.

Payment application 112 may further be implemented as a user interface enabling the user to provide payment. In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 150, including retrieving website information (e.g., a website for payment provider server 140) through a URL address provided by payment provider server 140, presenting the website information to the user, and/or communicating information to the website, including payment information for payment through payment provider server 140. However, in other embodiments, payment application 112 may include a dedicated application of payment provider server 140 or other entity (e.g., a merchant), which may be configured to provide payment account services and process financial transactions. Payment application 112 may be utilized to select payment instrument(s) for use in providing payment for a transaction, transfer, or other financial process. As discussed herein, payment application 112 may utilize user financial information, such as a credit card, bank account, or other financial account, as a payment instrument when providing payment information. Additionally, payment application 112 may utilize a user account with payment provider server 140, as the payment instrument. Selection of a payment instrument may occur prior to, at, or after establishment of the financial process. Payment provider server 140 may then use the payment instrument during processing of payment, as discussed herein with respect to payment provider server 140. Payment application 112 may be utilized to view the results of payment, for example, using transaction histories (e.g., receipts), dispute resolution processes, and other post-transaction process.

In various embodiments, the processes and features of broadcast generation application 120 and payment application 112 may be provided in a single application, such as a single dedicated application of payment provider server 140.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking, online payments, money transfer, or other applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user of communication device 110. Other applications may include social networking applications, media viewing, and/or merchant applications. Other applications may be used with broadcast generation application 120 and/or payment application 112 to process URLs and other types of URIs, as well as transmit broadcasts.

Other applications 114 may also be associated with other devices, such as biometric devices and other types of accessible or connected devices. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices, including GUIs capable of displaying information to users and other output devices, including speakers. Communication device 110 may include input devices, including touch screens. Communication device 110 may include a sensor or other component used to collect the current information associated with the user, such as an input device, a camera, a microphone, an accelerometer, a motion detector, an environmental sensor, and/or a biometric sensor.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment application 112 and/or other applications 114, identifiers associated with hardware of communication device 110, or other appropriate identifiers, such as identifiers used for payment/user/device authentication or identification, which may be communicated as identifying communication device 110 to payment provider server 140. Additionally, database 116 may store account information and/or account preferences for an account with payment provider server 140. Broadcasts generated using broadcast generation application 120 may be stored to database 116. Where applicable, information used by payment application 112 may be stored to database 116 (e.g., received broadcasts and associated URLs, as well as retrieved checkout and payment interfaces).

Communication device 110 includes at least one communication module 118 adapted to communicate with broadcasting device 130 and/or payment provider server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications:

Broadcasting device 130 may be implemented as a communication device that may utilize appropriate hardware and software configured for wired and/or wireless communication with communication device 110 and/or payment provider server 140. For example, in one embodiment, broadcasting device 130 may be implemented as a simple transceiver with associated memory and processor for transmitting data, as well as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only a single device is described in reference to FIG. 1, a plurality of broadcasting devices may function similarly.

Broadcasting device 130 of FIG. 1 contains a broadcasting application 132, other applications 144, a database 146, and a communication module 138. Broadcasting application 132 and other applications 144 may correspond to executable processes, procedures, and/or applications with associated hardware. In other embodiments, broadcasting device 130 may include additional or different modules having specialized hardware and/or software as required.

Broadcasting application 132 may correspond to one or more processes to execute software modules and associated devices of broadcasting device 130 to provide one or more broadcasts of a URL or other URI for a payment and checkout interface in a limited area associated with broadcasting device 130. In this regard, broadcasting application 132 may correspond to specialized hardware and/or software utilized by a user of broadcasting device 130 to access and transmit a broadcast stored to database 146. The broadcast may be generated using an application having similar features to those described in references to broadcast generation application 120. Thus, in various embodiments, broadcasting application 132 may include processes and features similar to those described in reference to broadcast generation application 120 of communication device 110. However, in other embodiments, another entity, such as payment provider server 140 or another device/server, may generate the broadcast. In such embodiments, the broadcast may be stored to broadcasting device 130, for example, in database 146, and may be accessible and transmittable using broadcasting application 132.

Thus, broadcasting application 132 may make the broadcast available to devices within the defined region set for reception of the broadcast. In certain embodiments, broadcasting application 132 may communicate the broadcast over short range wireless communications with another device, such as BLE. Thus, communication device 110 may receive the broadcast when communication device 110 is within range of the short range wireless communications for the broadcast transmitted by broadcasting application 132 (e.g., using communication module 138 of broadcasting device 130). In other embodiments, broadcasting application 132 may transmit the broadcast over network 150 to communication device 110, for example, on reception or detection of the geo-location of communication device 110 matching the defined region for the broadcast of broadcasting application 132. Once transmitted, a payment may be processed, as described herein.

In various embodiments, broadcasting application 132 may transmit a request to receive a payment from the user of communication device 110. In such embodiments, a payment may be processed using payment application 112 of communication device 110, as described herein. Where broadcasting application 132 correspond to a person, such as a user or merchant, broadcasting application 132 may further be used for transaction processing and viewing of transaction results. Thus, the user or merchant may confirm receipt of payment using broadcasting application 132. Additionally, where broadcasting device 130 corresponds to an automated machine, such as a vending machine, ticketing machine, or other type of sales machine, broadcasting application may further confirm receipt of payment and cause broadcasting device 130 to provide the purchase item or items to the user of communication device 110. In such embodiments, the item may be immediately released (e.g., vended through an opening for retrieval by a user) or may be released on identification of the user (e.g., through a transaction history code, identification card, etc.).

In various embodiments, broadcasting device 130 include other applications 144 as may be desired in particular embodiments to provide features to broadcasting device 130. For example, other applications 144 may include security applications for implementing client-side security features, programmatic client applications for interfacing with appropriate application programming interfaces (APIs) over network 150, or other types of applications. Where broadcasting device 130 corresponds to a user or merchant, other applications 144 may also include email, texting, voice and IM applications that allow a user to send and receive emails, calls, texts, and other notifications through network 150. In various embodiments, other applications 144 may include financial applications, such as banking, online payments, money transfer, or other applications. Other applications 144 may also include other location detection applications, which may be used to determine a location for the user, such as a mapping, compass, and/or GPS application, which can include a specialized GPS receiver that obtains location information for broadcasting device 130 and processes the location information to determine a location of broadcasting device 130 and the user. Other applications may include social networking applications, media viewing, and/or merchant applications. Other applications may be used to receive a URL address from a payee (e.g., communication device 110).

Where broadcasting device 130 corresponds to an automated device, other applications 144 may also include applications used for providing and/or vending items, as well as inventory items and display interfaces. Other applications 144 may include device interfaces and other display modules that may receive input from the user and/or output information to the user. For example, other applications 144 may contain software programs, executable by a processor, including a graphical user interface (GUI) configured to provide an interface to the user. Other applications 144 may therefore use devices of broadcasting device 130, such as display devices, including GUIs capable of displaying information to users and other output devices, including speakers. Broadcasting device 130 may include input devices, including touch screens, keypads, and/or keyboards.

Broadcasting device 130 may further include database 146 stored to a transitory and/or non-transitory memory of broadcasting device 130, which may store various applications and data and be utilized during execution of various modules of broadcasting device 130. Thus, database 146 may include, for example, identifiers such as operating system registry entries, cookies associated with broadcasting application 132 and/or other applications 144, identifiers associated with hardware of broadcasting device 130, or other appropriate identifiers, such as identifiers used for payment/user/device authentication or identification, which may be communicated as identifying broadcasting device 130 to payment provider server 140. Additionally, database 146 may store account information and/or account preferences for an account with payment provider server 140. Database 146 may store the broadcast communicated to communication device 110, as well as any results of transaction processing and information used for sales and purchases.

Broadcasting device 130 includes at least one communication module 138 adapted to communicate with communication device 110 and/or payment provider server 140. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 138 may communicate directly with nearby devices using short range communications, such as Bluetooth Low Energy, LTE Direct, WiFi, radio frequency, infrared, Bluetooth, and near field communications.

Payment provider server 140 may be maintained, for example, by an online service provider, which may provide connection services on behalf of users. In this regard, payment provider server 140 includes one or more processing applications which may be configured to interact with communication device 110, merchant device 150, and/or another device/server to facilitate connecting users having a shared interest. In one example, payment provider server 140 may be provided by PAYPAL®, Inc. of San Jose, Calif., USA. However, in other embodiments, payment provider server 140 may be maintained by or include another type of service provider, which may provide connection services to a plurality of users.

Payment provider server 140 of FIG. 1 includes a transaction processing application 142, other applications 144, a database 146, and a network interface component 148. Transaction processing application 142 and other applications 144 may correspond to executable processes, procedures, and/or applications with associated hardware. In other embodiments, payment provider server 140 may include additional or different modules having specialized hardware and/or software as required.

Transaction processing application 142 may correspond to one or more processes to execute software modules and associated specialized hardware of payment provider server 140 to establish, maintain, and provide a payment account to a user based on the user's payment instruments and provide payments using the payment account and/or payment instruments. In this regard, transaction processing application 142 may correspond to specialized hardware and/or software to receive information requesting establishment of the payment account. The information may include user personal and/or financial information. Additionally the information may include a login, account name, password, PIN, or other account creation information. The user may provide a name, address, social security number, or other personal information necessary to establish the account and/or effectuate payments through the account. Transaction processing application 142 may further allow the user to service and maintain the payment account, for example, by adding and removing payment instruments. Additionally, benefits received from merchant server 150 for connecting with another user may be stored and/or redeemed using transaction processing application 142. In various embodiments, transaction processing application 142 may further be utilized to perform one or more of the processes and/or features described in reference to broadcast generation application 120 of communication device 110. For example, transaction processing application or another application of payment provider server 140 may also be used to generate one or more broadcasts for a checkout and payment process and associated interface accessible through a URL or other URI. Moreover, such application may also transmit the broadcast, for example, over network 150 on detection of a geo-location of a device matching the defined region for the broadcast.

Transaction processing application 142 may be used to provide a payment for a checkout and payment process of a broadcast, for example, between communication device 110 and broadcasting device 130 using payment provider server 140. Transaction processing application 142 may debit an account of the payer (e.g., the user of communication device 110) automatically and provide the payment to an account of the payee (e.g., the entity controlling broadcasting device 130). Transaction processing application 142 may also use another payment instrument provided during the transaction and may process the payment instrument through the financial institution for the payment instrument. Transaction processing application 142 may also be used to provide transaction histories for processed transactions, payments, and transfers.

In various embodiments, payment provider server 140 includes other applications 144 as may be desired in particular embodiments to provide features to payment provider server 134. For example, other applications 144 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to the user when accessing payment provider server 140, where the user or other users may interact with the GUI to more easily view and communicate information. In various embodiments, other applications 144 may include connection and/or communication applications, which may be utilized to communicate information to over network 150.

Additionally, payment provider server 140 includes database 146. As previously discussed, a user corresponding to communication device 110 and/or a user/merchant corresponding to broadcasting device 130 may establish one or more digital wallets and/or payment accounts with payment provider server 140. Digital wallets and/or payment accounts in database 146 may include user information, such as name, address, birthdate, payment instruments/funding sources, additional user financial information, user preferences, and/or other desired user data. Users may link to their respective digital wallets and/or payment accounts through an account, user, and/or device identifier. Thus, when an identifier is transmitted to payment provider server 140, e.g., from communication device 110 and/or broadcasting device 130, one or more digital wallets and/or payment accounts belonging to the users may be found. Database 146 may also store broadcast information, as well as payment processing information for payments processed using the broadcast.

In various embodiments, payment provider server 140 includes at least one network interface component 148 adapted to communicate communication device 110 and/or broadcasting device 130 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

FIG. 2A is an exemplary screenshot of a communication device interface for selecting a broadcast for payment from a nearby user, according to an embodiment. FIG. 2A includes communication device 110 described in reference to environment 100 of FIG. 1. Additionally, communication device 110 may execute a broadcast generation application and/or a payment application such as broadcast generation application 120 and/or payment application 112 of communication device 110 in environment 100 of FIG. 1.

Communication device 110 shown in FIG. 2A shows an exemplary interface of a device application used to generate a broadcast having a URL (or other URI) for retrieval of a checkout and payment interface for a checkout and payment process. In this regard, an interface 1000 includes selectable items for generating a new broadcast 1002. For example, new broadcast 1002 may allow the user to select from any of types 1004. Types 1004 may be used to specify the type of the broadcast, and thus the type and extensions for the checkout and payment process. In this regard, types 1004 may correspond to various checkout and payment processes that may be established for the broadcasts. For example, types 1004 include a for sale type, a split bill type, a personal broadcast type of personal payment information, a ticket sales type, a multiple item sale type, and an auction sale type. Selection of one of types 1004 may begin the process for establishing a broadcast.

FIG. 2B is an exemplary screenshot of a communication device interface establishing a broadcast for communication to nearby devices using short range wireless communications, according to an embodiment. FIG. 2B includes communication device 110 described in reference to environment 100 of FIG. 1. Additionally, communication device 110 may execute a broadcast generation application and/or a payment application such as broadcast generation application 120 and/or payment application 112 of communication device 110 in environment 100 of FIG. 1.

Communication device 110 of FIG. 2B includes an interface for establishing information for a broadcast. In this regard, communication device 110 includes an interface 1006 where a user may enter information for a broadcast. For example, review fields 1008 may include one or more fields that may include selectable options for the broadcast and/or accepted input by the user for the broadcast. For example, a name field 1010 may allow a user to enter a name for the broadcast that may be displayed to other users viewing locally available broadcasts. For example, name field 1010 may display as "21 Speed Bike for Sale" to other users. Moreover, the user may specify a payment amount in a payment amount field 1012, shown as "$150.00." In a description field 1014, a user may enter a description, such as "21-speed Shimano Tourney . . . " Additional information may be entered to description field 1014. A type 1016 may be further displayed to the user in case the user wishes to switch types, and thus checkout and payment processes and broadcast extensions. Moreover, the user may select a communication pathway in communication field 1018, such as BLE shown in FIG. 2B.

In other embodiments, geo-location based transmission of broadcasts may be used. For example, FIG. 2C is an exemplary screenshot of a communication device interface establishing a broadcast for communication to nearby devices using geo-location detection, according to an embodiment. FIG. 2B includes communication device 110 described in reference to environment 100 of FIG. 1. Additionally, communication device 110 may execute a broadcast generation application and/or a payment application such as broadcast generation application 120 and/or payment application 112 of communication device 110 in environment 100 of FIG. 1.

For example, communication device 110 shown in FIG. 3C includes an interface for establishing a geo-location based local broadcast. For example, interface 1020 displays an interface for selecting a location for a broadcast so that the broadcast may be transmitted to devices in proximity to the location. Thus, the user may select a location through a map 1024, which may correspond to an address set by the user, a geo-location detected by a GPS locator, a location selected on a map, or other location setting. The location may be shown to the user in a location field 1026, and may also be entered by the user to location field 1026. Moreover, the user may set a proximity around the location to establish a defined region for the broadcast.

Figure 2D:
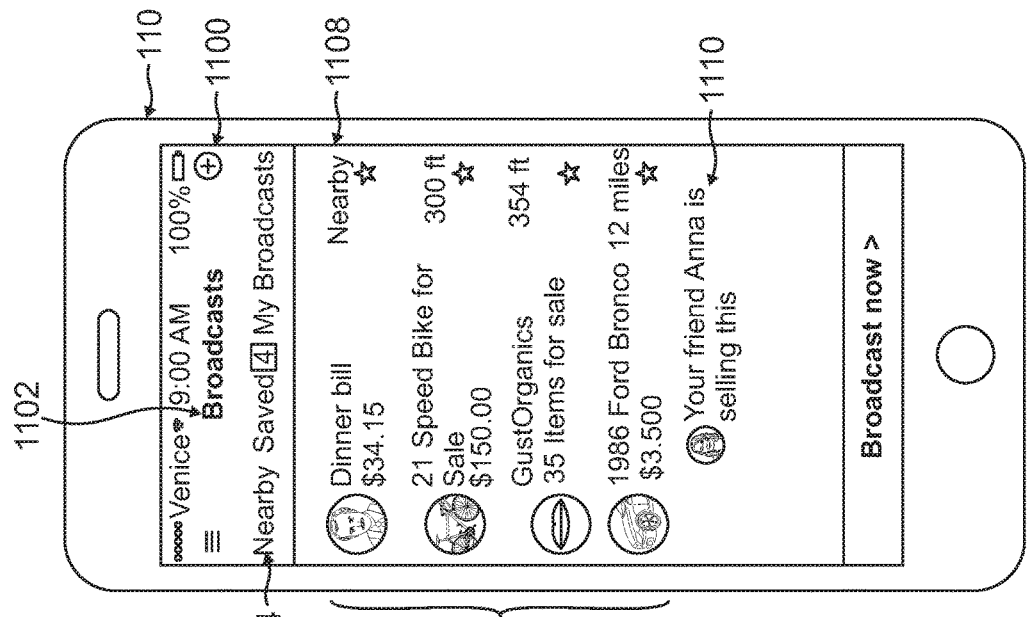
FIG. 2D is an exemplary screenshot of a communication device interface detecting nearby broadcasts for selection by a user, according to an embodiment.
Figure 2C:
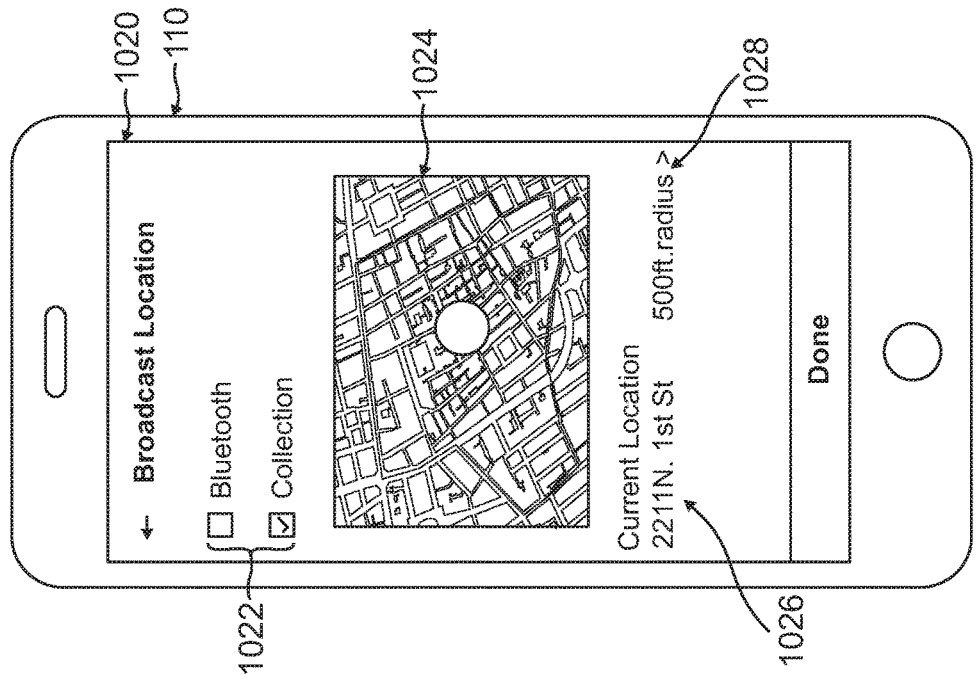
FIG. 2C is an exemplary screenshot of a communication device interface establishing a broadcast for communication to nearby devices using geo-location detection, according to an embodiment.

FIG. 2D is an exemplary screenshot of a communication device interface detecting nearby broadcasts for selection by a user, according to an embodiment. FIG. 2D includes communication device 110 described in reference to environment 100 of FIG. 1. Additionally, communication device 110 may execute a broadcast generation application and/or a payment application such as broadcast generation application 120 and/or payment application 112 of communication device 110 in environment 100 of FIG. 1.

Communication device 110 in FIG. 2D displays interfaces for discovering and displaying nearby broadcasts received by communication device 110. For example, through a geo-location of communication device 110 and/or short range wireless communications, an interface 1100 of communication device 110 may include a listing of nearby broadcasts available to the user of communication device 110. Thus, interface 1100 includes broadcasts 1102, which may include nearby broadcasts 1104, as well as selectable tabs for "saved" broadcasts and "my broadcasts" (e.g., transmitting broadcasts). Nearby broadcasts 1104 may include broadcasts listing 1106, which may display all available nearby broadcasts. Moreover, broadcasts listing 1106 may also display a distance 1108 for each broadcast. Additionally, broadcasts listing 1106 may also provide a highlight 1110, for example, if any of the broadcasts are from a known contact (e.g., a friend, stored contact, etc.).

Figure 2F:
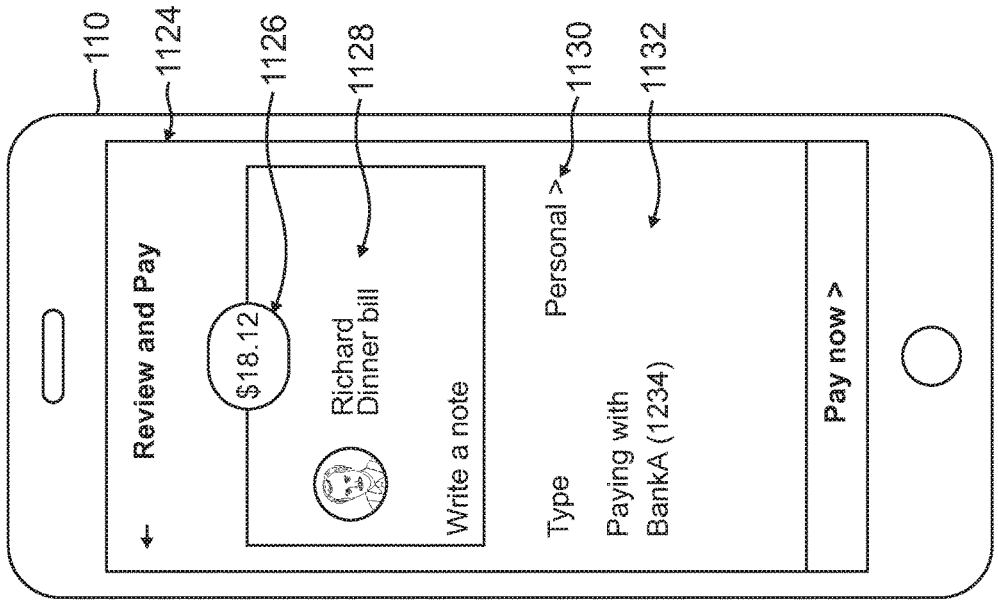
FIG. 2F is an exemplary screenshot of a communication device interface confirming payment processing details for a nearby broadcast, according to an embodiment.
Figure 2E:
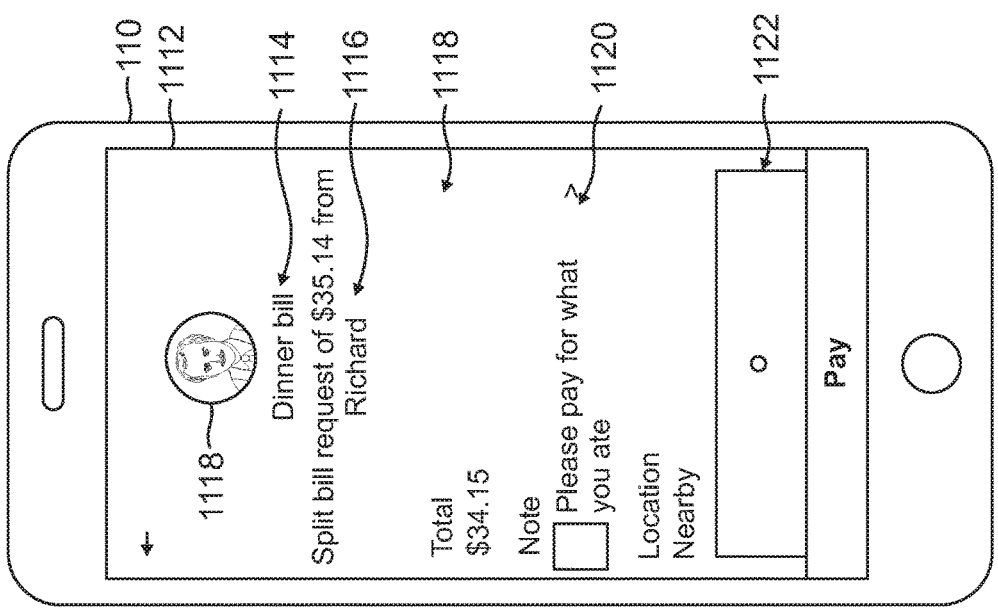
FIG. 2E is an exemplary screenshot of a communication device interface after selection of a nearby broadcast for payment processing, according to an embodiment.

FIG. 2E is an exemplary screenshot of a communication device interface after selection of a nearby broadcast for payment processing, according to an embodiment. FIG. 2E includes communication device 110 described in reference to environment 100 of FIG. 1. Additionally, communication device 110 may execute a broadcast generation application and/or a payment application such as broadcast generation application 120 and/or payment application 112 of communication device 110 in environment 100 of FIG. 1.

Communication device 110 of FIG. 2E includes an interface that may display information for a selected broadcast from broadcasts listing 1106. For example, interface 1112 includes a displayed broadcast having various broadcast information. The displayed broadcast may include a checkout and payment interface retrieved using a URL or other URI from a broadcast, which may include a process for sending and/or receiving payments. For example, the checkout and payment interface of interface 1112 is shown with a name 1114, such as "Dinner bill," which may be used to identify the nature and/or type of the checkout and payment process of the broadcast. Additionally, interface 1112 includes a description 1116, a payment amount 1118, a user image 1118 for identification of the originator of the broadcast, a note 1120 to the recipient of the broadcast, and a location display 1122. In various embodiments, interface 1112 may include more, less, or different information as required.

FIG. 2F is an exemplary screenshot of a communication device interface confirming payment processing details for a nearby broadcast, according to an embodiment. FIG. 2F includes communication device 110 described in reference to environment 100 of FIG. 1. Additionally, communication device 110 may execute a broadcast generation application and/or a payment application such as broadcast generation application 120 and/or payment application 112 of communication device 110 in environment 100 of FIG. 1.

Communication device 110 of FIG. 2F includes an interface used for reviewing a payment request for a checkout and payment process retrieved from a selected broadcast. For example, interface 1124 includes information for review for the payment request. For example, interface 1124 is shown with a payment request amount 1126. Interface 1124 may further display broadcast information 1128, which may correspond to information for the checkout and payment process. Moreover, interface 1124 includes payment instrument selection 1130 for use in the payment request, as well as a payment instrument 1132 selected by the user of communication device 110.

Figure 3:
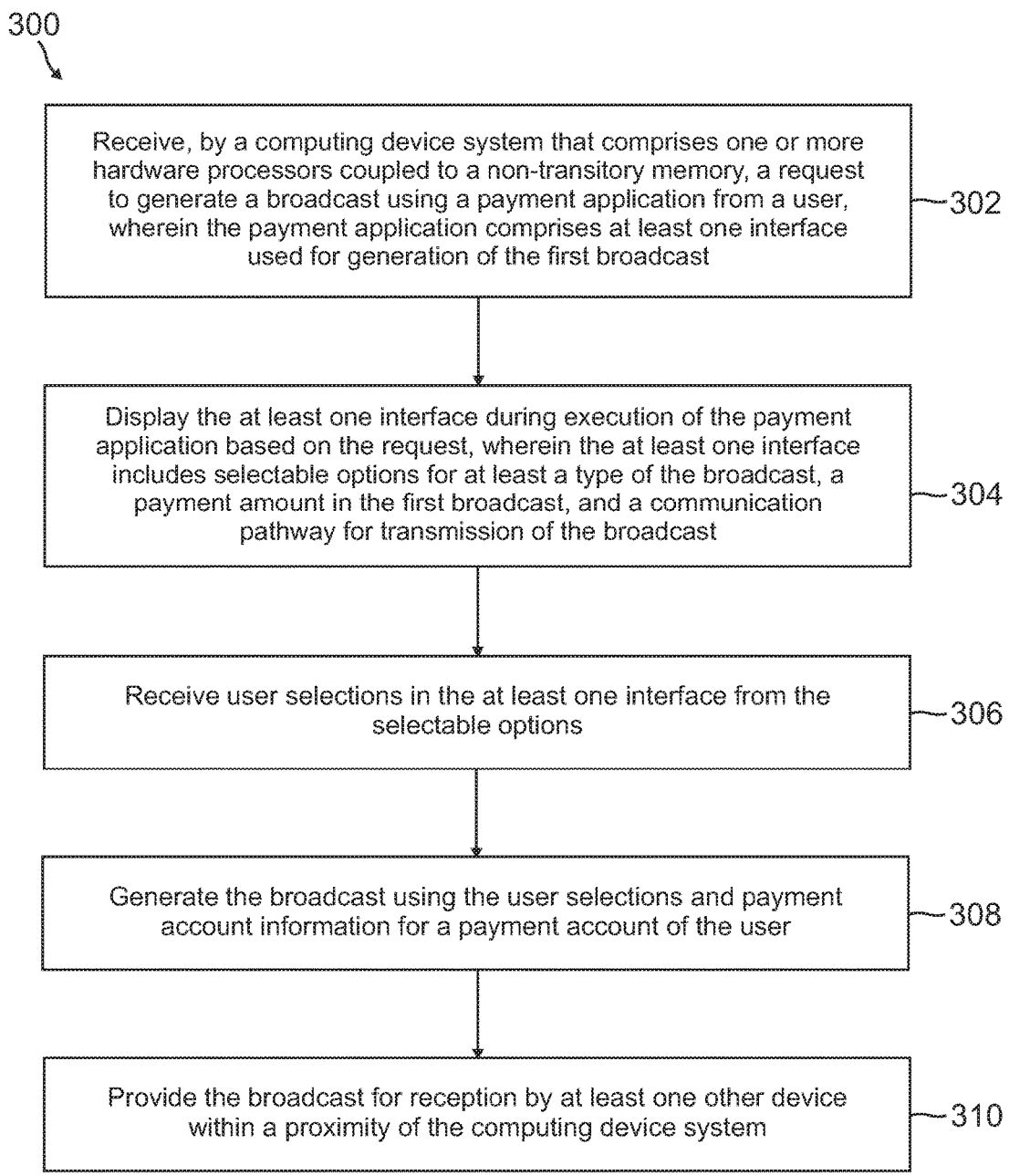
FIG. 3 is a flowchart of an exemplary process to generate locally broadcasted uniform resource locators for checkout and payment processes, according to an embodiment.

FIG. 3 is a flowchart of an exemplary process to generate locally broadcasted uniform resource locators for checkout and payment processes, according to an embodiment. Note that one or more steps, processes, and methods described herein may be omitted, performed in a different sequence, or combined as desired or appropriate.

At step 302, a request to generate a broadcast using a payment application is received from a user, by a computing device system that comprises one or more hardware processors coupled to a non-transitory memory, wherein the payment application comprises at least one interface used for generation of the first broadcast.

The at least one interface is displayed during execution of the payment application based on the request, wherein the at least one interface includes selectable options for at least a type of the broadcast, a payment amount in the first broadcast, and a communication pathway for transmission of the broadcast, at step 304. The type of the broadcast may comprise one of a first payment made to another entity by the user for the payment amount and a second payment received from another entity by the user for the payment amount. Moreover, the type of the broadcast may comprise one of a split payment for a transaction, a purchase offer for one or more item sold by the user, a payment request made to the user, and an auction for one or more items sold by the user. The communication pathway for transmission of the broadcast may use one of network communications of the broadcast based on a geo-location for the broadcast selected by the user and Bluetooth Low Energy (BLE) communications with the computing device system. The at least one interface may provide at least one module to generate a checkout and payment process for the broadcast in the at least one interface.

At step 306, user selections are received in the at least one interface from the selectable options. In various embodiments, additional information for the broadcast may be received in the at least one interface, wherein the additional information comprises a location for the broadcast, a user picture, an item picture, a description of the broadcast, a message with the broadcast, and a proximity around the location. At step 308, the broadcast is generated using the user selections and payment account information for a payment account of the user. The broadcast may comprise a uniform resource locator (URL) for the user, or other type of URI that identifies a resource for the user. The URL may comprise one of an address for a webpage to provide the payment amount to the user, an address for a payment application action to provide the payment amount to the user, and an address for a payment application download from a payment provider.

The broadcast is provided for reception by at least one other device within proximity of the computing device system, at step 310. For example, the URL may direct the at least one other device to a checkout and payment process with a payment provider associated with the payment account of the user. The checkout and payment process comprises a purchase from the user associated with the payment account, and wherein the purchase provides the payment amount to the payment account of the user. The broadcast may be highlighted on the at least one other device on reception of the broadcast by the at least one device when the user is known by another user for the at least one other device.

Figure 4:
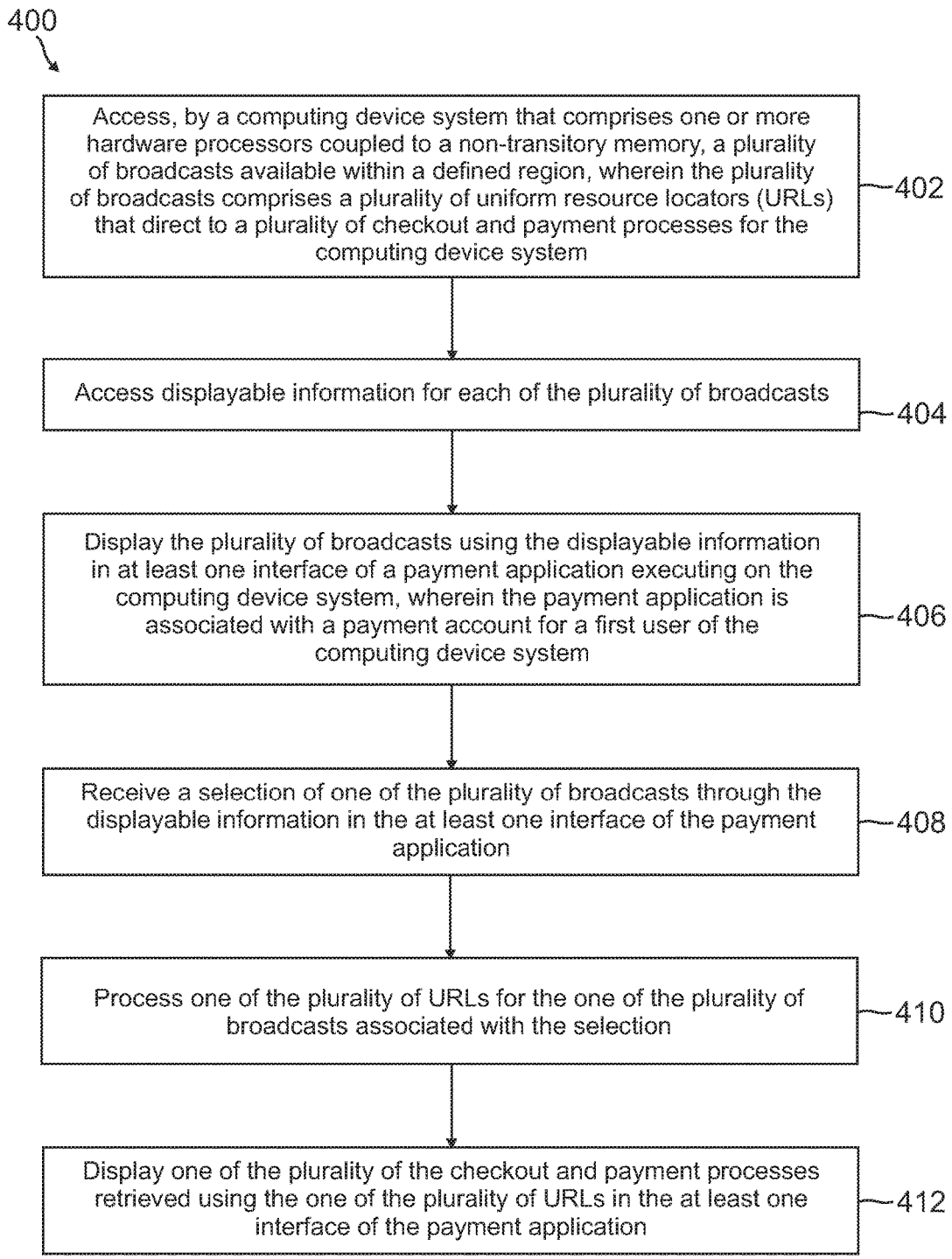
FIG. 4 is a flowchart of an exemplary process to find locally broadcasted uniform resource locators for checkout and payment processes, according to an embodiment.

FIG. 4 is a flowchart of an exemplary process to find locally broadcasted uniform resource locators for checkout and payment processes, according to an embodiment. Note that one or more steps, processes, and methods described herein may be omitted, performed in a different sequence, or combined as desired or appropriate.

At step 402, a plurality of broadcasts available within a defined region may be accessed, by a computing device system that comprises one or more hardware processors coupled to a non-transitory memory, wherein the plurality of broadcasts comprise a plurality of uniform resource locators (URLs) that direct to a plurality of checkout and payment processes for the computing device system. The plurality of broadcasts may be accessed by the computing device system using at least one of Bluetooth Low Energy communications with another device within the defined region and network communications with a payment provider providing the plurality of broadcasts to the computing device system while the computing device system is within the defined region.

Displayable information for each of the plurality of broadcasts is accessed, at step 404. At step 406, the plurality of broadcasts are displayed using the displayable information in at least one interface of a payment application executing on the computing device system, wherein the payment application is associated with a payment account for a first user of the computing device system. A selection of one of the plurality of broadcasts is received through the displayable information in the at least one interface of the payment application, at step 408. One of the plurality of URLs for the one of the plurality of broadcasts associated with the selection is processed, at step 410.

At step 412, one of the plurality of the checkout and payment processes retrieved using the one of the plurality of URLs is displayed in the at least one interface of the payment application. Additionally, a payment request is received from the first user to a second user for the one of the plurality of the checkout and payment processes, and the payment request is processed to provide the payment amount to the second user. The payment request may be processed using an online payment provider providing the payment account associated with the payment application. The one of the plurality of URLs for the one of the plurality of broadcasts may be associated with a nearby user within the defined region, wherein the one of the plurality of the checkout and payment processes retrieved using the one of the plurality of URLs directs the computing device system to a payment to the nearby user.

In various embodiments, at least one of the plurality of broadcasts is associated with an automated machine device offering to sell a product to the user, and wherein the at least one of the plurality of broadcasts directs the payment application to a checkout and payment process for the automated machine device. The automated machine device may provide the product to the user on processing of a payment to the automated machine device using the checkout and payment process for the automated machine device. In this regard, an online payment provider may generate a URL in the at least one of the plurality of broadcasts associated with the automated machine device.

Figure 5:
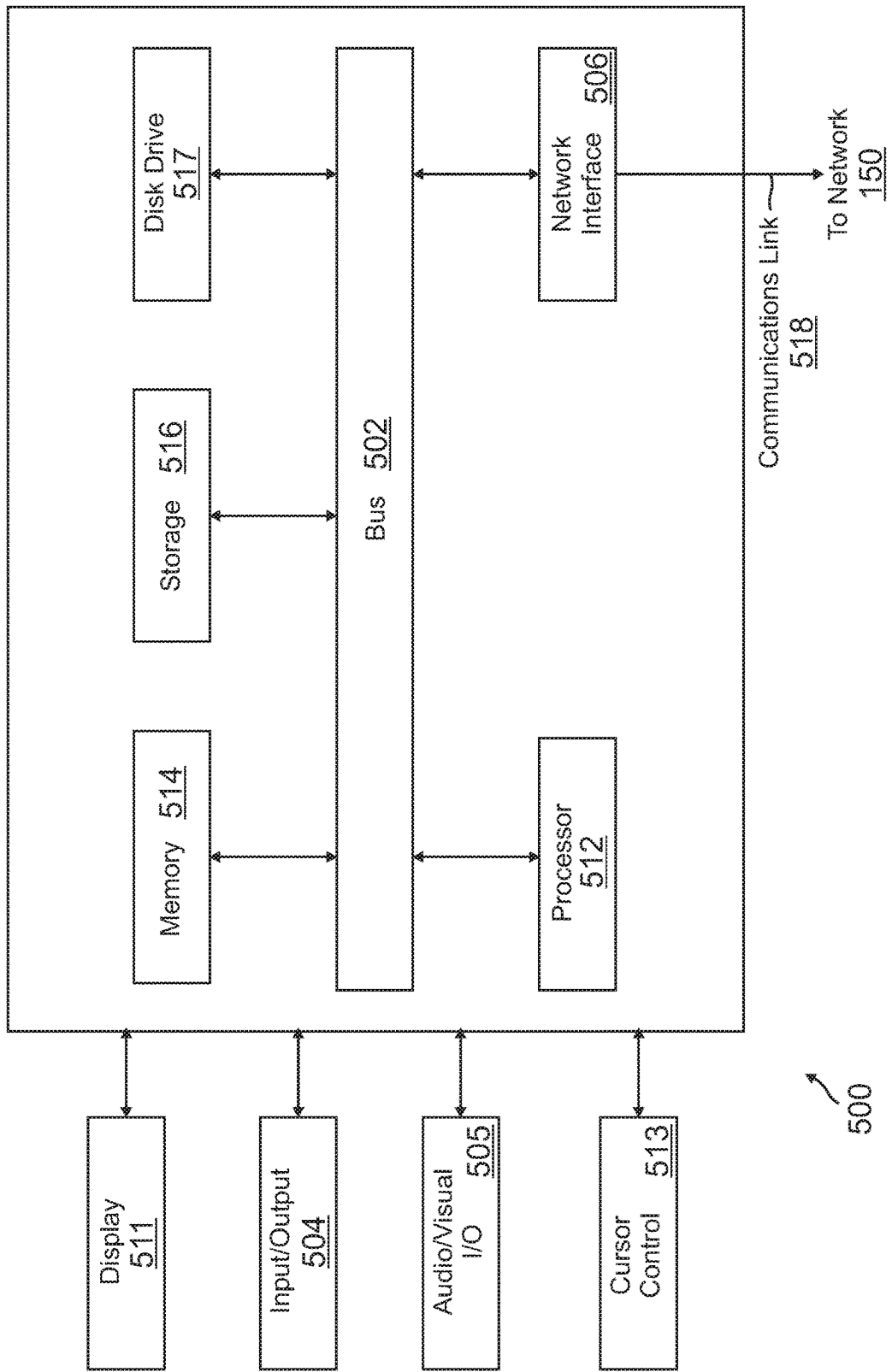
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing device system comprising:
a non-transitory memory storing a plurality of broadcasts available within a defined region, wherein the plurality of broadcasts are received when the computing device system of a first user is within the defined region, and wherein the plurality of broadcasts comprise a plurality of uniform resource locators (URLs) that direct to application data for a plurality of checkout and payment processes for an application on the computing device system; and
one or more hardware processors coupled to the non-transitory memory and configured to execute instructions to cause the computing device system to perform operations comprising:
detecting the plurality of broadcasts;
displaying a plurality of selectable elements corresponding to the plurality of broadcasts in an interface of the application executing on the computing device system, wherein the plurality of broadcasts are each displayed with a distance to a merchant location for each of the plurality of checkout and payment processes;
receiving a selection of one of the plurality of selectable elements for one of the plurality of broadcasts in the interface of the application;
retrieving the application data for the one of the plurality of broadcasts using one of the plurality of URLs for the one of the plurality of broadcasts, wherein the application data loads a checkout and payment process for the one of the plurality of broadcasts in the application;
loading the application data to the application;
displaying the checkout and payment process in the application using the application data; and
processing a transaction using the checkout and payment process in the application.

2. The computing device system of claim 1, wherein each of the plurality of broadcasts comprise a type, and wherein the type comprises one of a first payment made to another entity by the first user for a payment amount or a second payment received from another entity by the first user for the payment amount.

3. The computing device system of claim 1, wherein each of the plurality of broadcasts are communicated to the computing device system through a communication pathway for transmission of the each of the plurality of broadcasts, and wherein the communication pathway uses one of network communications based on a geo-location for the computing device system or Bluetooth Low Energy (BLE) communications with the computing device system.

4. The computing device system of claim 1, wherein the one of the plurality of URLs is associated with a second user.

5. The computing device system of claim 4, wherein the one of the plurality of URLs comprises one of an address for a webpage to provide a payment amount to the second user, an address for an application action to provide the payment amount to the second user, or an address for an application download from a payment provider.

6. The computing device system of claim 4, wherein the one of the plurality of URLs directs the computing device system to the checkout and payment process with a payment provider associated with a payment account of the second user.

7. The computing device system of claim 6, wherein the checkout and payment process comprises a purchase by the first user from the second user, and wherein the purchase provides a payment amount to the payment account of the second user.

8. The computing device system of claim 1, wherein the transaction is processed using an online payment provider providing a payment account associated with the application.

9. The computing device system of claim 1, wherein the operations further comprise:
   receiving additional information for each of the plurality of broadcasts, wherein the additional information comprises a location, a user picture, an item picture, a description, a message, or a proximity.

10. The computing device system of claim 1, wherein at least one of the plurality of broadcasts is highlighted on the computing device system when a second user associated with the one of the plurality of broadcasts user is known by the first user.

11. The computing device system of claim 1, wherein at least one of the plurality of broadcasts is associated with an automated machine device offering to sell a product to the first user, and wherein the one of the plurality of broadcasts directs the application to the checkout and payment process for the automated machine device.

12. A method comprising:
   detecting, by a computing device system that comprises one or more hardware processors coupled to a non-transitory memory, a plurality of broadcasts available within a defined region, wherein the plurality of broadcasts comprise a plurality of uniform resource locators (URLs) that direct to a plurality of checkout and payment processes for the computing device system;
   displaying a plurality of selectable elements corresponding to the plurality of broadcasts in an interface of an application executing on the computing device system, wherein the plurality of broadcasts are each displayed with a distance to a merchant location for each of the plurality of checkout and payment processes;
   receiving a selection of one of the plurality of selectable elements for one of the plurality of broadcasts in the interface of the application;
   retrieving application data for the one of the plurality of broadcasts using one of the plurality of URLs for the one of the plurality of broadcasts, wherein the application data loads a checkout and payment process for the one of the plurality of broadcasts in the application;
   loading the application data to the application;
   displaying the checkout and payment process retrieved in the application using the application data; and
   processing a transaction using the checkout and payment process in the application.

13. The method of claim 12, wherein the processing the transaction comprises:
   receiving a payment request from a first user to a second user; and
   processing the payment request to provide a payment amount to the second user.

14. The method of claim 13, wherein the payment request is processed using an online payment provider providing a payment account associated with the application.

15. The method of claim 12, wherein the plurality of broadcasts are accessed by the computing device system using at least one of Bluetooth Low Energy communications with another device within the defined region or network communications with a payment provider providing the plurality of broadcasts to the computing device system while the computing device system is within the defined region.

16. The method of claim 12, wherein at least one of the plurality of broadcasts is associated with an automated machine device offering to sell a product to a user, and wherein the at least one of the plurality of broadcasts directs the application to the checkout and payment process for the automated machine device.

17. The method of claim 16, wherein the automated machine device provides the product to the user on processing of a payment to the automated machine device using the checkout and payment process for the automated machine device.

18. The method of claim 16, wherein an online payment provider generates the one of the plurality of URLs associated with the automated machine device.

19. The method of claim 12, wherein the one of the plurality of URLs for the one of the plurality of broadcasts is associated with a second user within the defined region, and wherein the one of the plurality of the checkout and payment processes retrieved using the one of the plurality of URLs directs the computing device system to a payment to the second user.

20. A non-transitory machine-readable medium having stored thereon machine-readable instructions executable to cause a machine to perform operations comprising:
   detecting, by a computing device system that comprises one or more hardware processors coupled to a non-transitory memory, a plurality of broadcasts available within a defined region, wherein the plurality of broadcasts comprise a plurality of uniform resource locators (URLs) that direct to a plurality of checkout and payment processes for the computing device system;
   displaying a plurality of selectable elements corresponding to the plurality of broadcasts in an interface of an application executing on the computing device system, wherein the plurality of broadcasts are each displayed with a distance to a merchant location for each of the plurality of checkout and payment processes;
   receiving a selection of one of the plurality of selectable elements for one of the plurality of broadcasts in the interface of the application;
   retrieving application data for the one of the plurality of broadcasts using one of the plurality of URLs for the one of the plurality of broadcasts, wherein the application data loads a checkout and payment process for the one of the plurality of broadcasts in the application;
   loading the application data to the application;
   displaying the checkout and payment process in the application using the application data; and
   processing a transaction using the checkout and payment process in the application.

* * * * *